Figure 1:
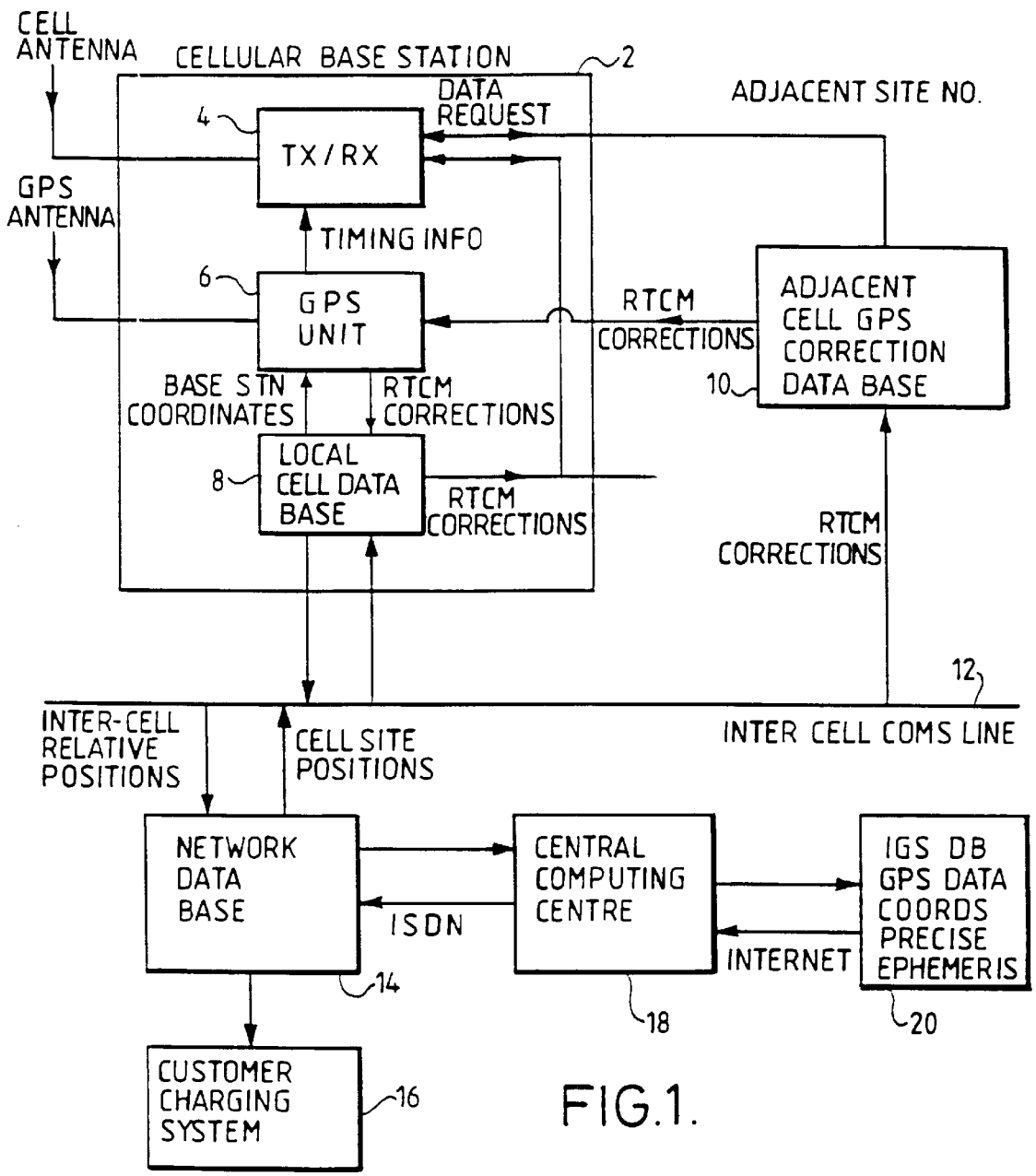

United States Patent
Ffoulkes-Jones

[19]
[11] Patent Number: 6,128,501
[45] Date of Patent: *Oct. 3, 2000

[54] MOBILE POSITION DETERMINATION WITH ERROR CORRECTION UTILIZING CELLULAR NETWORKS

[75] Inventor: Geraint Ffoulkes-Jones, Kislingbury, United Kingdom

[73] Assignee: Symmetricom, Inc., San Jose, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/758,728

[22] Filed: Dec. 3, 1996

[30] Foreign Application Priority Data

Dec. 4, 1995 [GB] United Kingdom .................. 9524754

[51] Int. Cl.$^7$ ........................................ H04Q 7/22
[52] U.S. Cl. ................... 455/456; 455/427; 455/12.1; 342/358; 701/216
[58] Field of Search .................. 455/403, 422, 455/426, 427, 456, 502, 550, 561, 405, 406, 12.1, 13.2; 342/357, 458, 456, 358; 701/200, 207, 213–14, 216, 300

[56] References Cited

U.S. PATENT DOCUMENTS

| | | |
|---|---|---|
| 5,043,736 | 8/1991 | Darnell et al. . |
| 5,148,179 | 9/1992 | Allison . |
| 5,303,297 | 4/1994 | Hillis ........................................ 455/406 |
| 5,390,124 | 2/1995 | Kyrtsos . |
| 5,617,100 | 4/1997 | Akiyoshi et al. ........................ 342/357 |
| 5,646,844 | 7/1997 | Gudat et al. ........................... 701/213 X |
| 5,727,034 | 3/1998 | Ojaniemi ................................. 375/356 |
| 5,760,742 | 6/1998 | Branch et al. .......................... 455/456 X |

FOREIGN PATENT DOCUMENTS

| | | |
|---|---|---|
| 634587 | 4/1991 | Australia . |
| 3152893 | 7/1993 | Australia . |
| 351156 | 1/1990 | European Pat. Off. . |
| 444738 | 9/1991 | European Pat. Off. . |
| 0588598 | 3/1994 | European Pat. Off. . |
| 63-187174 | 8/1988 | Japan . |
| 4266228 | 9/1992 | Japan . |
| 4315076 | 11/1992 | Japan . |
| 2256987 | 12/1992 | United Kingdom . |
| 2264837 | 9/1993 | United Kingdom . |
| 8706713 | 11/1987 | WIPO . |
| 9309446 | 5/1993 | WIPO . |
| 9412892 | 6/1994 | WIPO . |
| 9415412 | 7/1994 | WIPO . |
| 9422032 | 9/1994 | WIPO . |
| 9418978 | 7/1995 | WIPO . |
| 9527909 | 10/1995 | WIPO . |

OTHER PUBLICATIONS

International Search Report for PCT/AU93/00614 dated Mar. 15, 1994.
UK Search Reportfor GB 9625049.3 dated Jan. 27, 1997.

*Primary Examiner*—William G. Trost
*Attorney, Agent, or Firm*—Wilson, Sonsini, Goodrich & Rosati

[57] ABSTRACT

A position determining system takes the form of a cellular radio system including at least one base station having a base station satellite receiver (6) and a mobile unit including a cellular mobile station (50) coupled to a local satellite receiver (58). The base station transmits base station satellite data via a cellular radio link to the mobile unit, the data including data representing a carrier phase measurement derived from a satellite signal (70) received by the base station satellite receiver (6). The mobile unit determines its position relative to the base station using local satellite data received by the local satellite receiver (58) and corrects errors in this position determination using base station satellite data. The relative positions of the base stations are determined automatically with reference to an external positional reference which may be a satellite-based position determining system.

16 Claims, 3 Drawing Sheets

MOBILE POSITION DETERMINATION WITH ERROR CORRECTION UTILIZING CELLULAR NETWORKS

The present invention relates to position-determining apparatus particularly but not exclusively for mobile use and has particular application in land surveying.

The infrastructure currently available to surveyors, map makers, GIS data collectors and navigators, for example, for high precision positioning is historically based on a national triangulation scheme. The infrastructure includes a network of markers such as triangulation pillars, whose coordinates are known and are usually sold to interested parties through the country's national mapping agency.

Historically, geodetic surveying was performed optically using a device such as a theodolite in conjunction with the markers. For this reason, many of the markers are located at the tops of hills to ensure that they are readily intervisible. This historical system has several drawbacks.

Firstly, although the positions of the markers have been measured over many years and have been computed with additional data such as that provided by satellite positioning systems e.g. Global Positioning System (GPS), the network of markers and their coordinates frequently include significant errors. For example, in the UK the ordnance survey mapping is based on a triangulation performed in 1936 (the so-called OSGB36 triangulation). This is known to represent the United Kingdom as having a north-south length 20 metres different from its true length. Various more recent, more accurate and therefore different triangulations (such as OSGB72 and OS(SN)80) are used in different fields such as engineering. The use of different triangulation networks causes confusion. Secondly, the above problem is exacerbated by the respective existence of two independent triangulation networks for the determination of horizontal and vertical positions. To make matters worse, the markers for the two independent networks are not necessarily co-located.

In most countries, the national mapping organisation maintains the triangulation network. Income is generated from the network by one-off payments for the sale of the computed coordinates of the markers. Thus the revenue is limited and arises in significant amounts only sporadically e.g. when the positions of the markers have been recalculated. It is not uncommon, however, for markers to be destroyed or to move due to ground movement. With inadequate maintenance, further inaccuracies are thereby introduced into the triangulation networks.

It is known to perform accurate position determinations using a differential GPS-type measurement in which two satellite receivers are used, one being placed at a known position and the other being placed at a position to be determined. It is possible to use a triangulation marker as the known position. However, this has at least two disadvantages. Firstly the coordinates of the marker may be inaccurate for the reasons given above and secondly the markers are frequently positioned in inaccessible areas such as hilltops, as described above. In some countries, such as the United Kingdom, new markers suitable for the use of GPS equipment are being placed in more accessible areas so that the satellite receiver of known position (the so-called master station) can more conveniently be set up. For example, in the United Kingdom the new GPS control markers can all be accessed with a 2-wheel drive vehicle. However, for a party to take advantage of this it is necessary for the party to provide both satellite receivers at each respective site and to set them up itself; this being relatively expensive and inconvenient.

Currently there exists a worldwide network of several hundred tracking stations incorporating permanently recording dual-frequency geodetic GPS receivers. This network is called the IGS (International GPS Service for Geodynamics) network.

Further features of IGS are summarised in document JPL 400-552 6/95 published by the Jet Propulsion Laboratory of the California Institute of Technology and entitled "Monitoring Global Change by Satellite Tracking". In particular, the IGS network provides online access to IGS tracking station coordinates and velocities, GPS satellite to IGS tracking station measurement information, and very accurate GPS satellite ephemerides.

The so-called Precise Ephemerides, precise GPS satellite orbit and clock data are available in near real-time (approximately a day late). The tracking station coordinates are regularly computed and published and have a relative accuracy of between 3 mm and 1 cm between any two sites around the world.

These published "control" coordinates can be regarded as absolute reference positions to which differential GPS measurements can be referred in order to define actual coordinates for the newly surveyed points. Any position obtained using a differential GPS technique is in fact only a relative position with respect to the stations providing the measurement and/or measurement correction data.

Whilst sufficient information exists to use one of these receivers for differential GPS measurements, it should be appreciated that due to differences in propagation conditions existing between the satellites and the master station and the satellites and the position to be determined, that the accuracy of differential GPS is diminished as the distance between the master station and the position to be determined increases (typically at a rate of 0.5 to 1 mm per kilometre separation). Thus it is not possible to use an IGS or equivalent receiver for high accuracy real-time position determination in all areas.

Attempts have been made to use the base station of a cellular radio network as the reference station in a differential GPS arrangement. Two such attempts are described in GB 2264837-A and WO94/12892 respectively. However, both of these attempts have been made in order to provide vehicle location facilities for vehicle fleet managers. Since the described systems do not seek to solve the problem of providing high accuracy measurements for surveying, these systems do not provide sufficient positioning accuracy for surveying.

According to a first aspect of the present invention, position determining apparatus comprises a cellular radio system including at least one base station having a base station satellite receiver, and position determination means including a cellular mobile station coupled to a local satellite receiver, the base station being arranged to transmit base station satellite data including data representing a carrier phase measurement derived from a satellite signal received by the base station satellite receiver to the mobile station via a cellular radio link and the position determination means being arranged to determine its position relative to the base station using local satellite data received by the local satellite receiver and to correct errors in this position determination using the base station satellite data.

In this application the term "base station" means a cellular radio base station forming part of a cellular radio communication infrastructure having a plurality of such base stations which are capable of exchanging radio signals with a plurality of cellular mobile stations such as mobile cellular telephones over cellular radio links.

Most digital cellular telephone base stations (e.g. GSM base stations) need to have access to a precise timing system to ensure the accuracy of the TDMA modulation techniques used. A common and cost-effective method of providing the necessary accuracy of timing is to use the accurate timing built into the GPS system. Each of the GPS satellites has a plurality of atomic clocks which are monitored and adjusted from stations on the ground. Thus, using conventional techniques it is possible to derive an extremely accurate (down to nanosecond accuracies) timing signal from received GPS signals. For this reason, many base stations already include a base station satellite receiver which is used to steer a high quality oscillator for the TDMA timing. This means that the cost of the present invention in terms of adapting the cellular radio system hardware can be minimal. The base station satellite data transmitted to the mobile station may be raw GPS data (typically pseudorange and carrier phase measurements in a standard format such as. RINEX-Receiver Independent Exchange) and information concerning the precise position of the base station. From this information, the position determination means may calculate its own measurement corrections. Using this information, the determination means may correct for errors such as satellite clock and orbit errors and atmospheric propagation effects to improve the accuracy of a position determined using the local satellite data. The use of carrier phase measurements provides the accuracy required of surveying apparatus. Correction data based on a code phase measurement does not provide sufficient accuracy.

The mobile station may be a conventional mobile station having a data communication facility. Data communication is built into most digital cellular radio specifications (including GSM) and is already used for mobile modem connections for laptop computers.

The relative position determination may be performed in real-time using the local and base station satellite data to perform a differential GPS measurement or alternatively both signals may be logged to a data recorder and the calculations performed later. Data-logging may be performed in addition to a real-time calculation so that the position solutions may be double-checked later, or the raw data may be archived for QA (quality assurance) purposes.

The accuracy of the relative position determination achieved using apparatus according to the invention will depend in part on the quantity, or more importantly the duration, of data received from the base station. By providing billing means arranged to measure the duration of a transmission to the mobile station, the user may be charged for the length of time for which data is transmitted to the mobile station which relates directly to the quality of the relative position determination.

The quality of the position determination may further be enhanced by making additional relative determinations using base station satellite data received from alternative adjacent base stations. This allows independently determined position solutions to be compared.

Each base station may include a local database including information relating to its own location, the location of adjacent base stations, the telephone number for the service for the adjacent base stations, and/or predetermined GPS measurements. The base stations are preferably interconnected using existing land lines to permit the interchange of at least information related to the relative locations of adjacent base stations. Preferably the location information held in the local databases is coordinated by at least one central computing centre (CCC), which is connected to each base station.

According to a second aspect of the invention, a cellular radio system includes at least one base station satellite receiver and is operable to transmit base station satellite data including data representative of a carrier phase measurement derived from a satellite signal received by the base station satellite receiver for reception by remote position determination means comprising a mobile station coupled to a remote satellite receiver, for use in computing the position of the remote determination means relative to the base station based on the base station satellite data received by the remote satellite receiver.

According to a third aspect of the invention, a method of position determination using a cellular radio infrastructure having a plurality of base stations are of known position and include a respective satellite receiver, wherein the method comprises transmitting from at least one of the base stations via a cellular radio link, base station satellite data derived from a satellite signal received by the base station satellite receiver, wherein the data includes data representative of a carrier phase measurement and is transmitted to a cellular mobile station coupled to a local satellite receiver, and wherein the method further comprises using the base station satellite data received via the cellular radio link to determine the position of the mobile station relative to the said base station based on local satellite data received by the local satellite receiver.

According to a fourth aspect of the invention a method of operating a cellular radio infrastructure having at least one base station including a base station satellite receiver comprises transmitting base station satellite data including data representative of carrier phase measurement derived from satellite signals received by the base station satellite receiver for reception by a cellular mobile station and for computation of the position of the mobile station relative to the base station based on data received by a satellite receiver associated with the mobile station.

According to a fifth aspect of the invention a method of operating a mobile position-determining unit which includes a cellular mobile station coupled to a local satellite receiver, receiving at least a carrier phase measurement from a cellular base station of known position and forming part of a cellular radio infrastructure and computing the position of the mobile unit relative to the base station position based on the local satellite data and the remote satellite data.

According to a sixth aspect of the invention, there is provided a method of determining the position of a plurality of cellular base stations forming part of a cellular radio system, each base station having a base station satellite position fixing system, wherein the method comprises determining the position of at least one base station relative to the position of a reference satellite position-fixing system located at a known position by passing correction information derived from the reference position fixing system to the said at least one base station to permit correction of the base station position determined by the respective base station position fixing system thereby to determine the position of the base station more accurately, and using the more accurately determined position of the said base station to permit the said base station to replace the reference satellite position-fixing system as a reference for the more accurate determination of the position of another of the base stations.

The external reference satellite position fixing system may be one of the above mentioned IGS receivers. Starting with this known reference, the accurate position of each of the base stations may be determined using relative GPS carrier phase measurements initially between the external reference system and base stations and then between adjacent base stations throughout the whole cellular system. Preferably, as many base station positional measurements as possible are taken directly from one or more external reference satellite position fixing systems to minimize the cumulative effect of errors as the base station position determinations propagate through the cellular system.

Each base station may undertake the abovementioned measurement of its own position relative to adjacent base stations as a background task over many hours or days. It may do this using a differential GPS measurement using an adjacent base station as the master station. It will be appreciated that since in a differential GPS measurement the position of the master station is assumed to be known, any errors in the position of the master station will translate directly into an equivalent error in any measurement taken using that master station. Thus, in effect, the measurement is always made relative to the master station.

Relative position data (typically in the form of position vectors of a base station relative to the external reference system) are preferably communicated back to the CCC which can monitor trends in movements of a particular base station and can determine the correct functioning of the satellite receiving equipment of each base station by checking the relative positions of adjacent base stations against their expected and/or previous fixes. The check will also highlight movement of the base station such as may be caused by mining subsidence. The CCC preferably also operates to scale, orient and adjust the determined relative positions of the base stations to ensure that their determined absolute position fixes fit plausibly within the network of external reference satellite position fixing systems. It will be noted that a self-determined relative base station position measurement can be cross-referenced with a measurement based on any available adjacent base station. Thus the CCC has a margin of redundant data with which to determine where errors or movements seem to be occurring. The CCC adjustment may be performed using "least squares" optimisation algorithms.

Similarly, when a new base station is installed, its position may be determined with reference to adjacent base stations. In this way, the system can be expanded and made self-calibrating. Periodically, the network-wide and local databases may be updated with revised position calculations for each of the base stations. At the same time, the updated positions may be published to the surveying community.

Thus, in summary, the invention provides accurate, reliable and convenient positioning information requiring the user to have only a cellular mobile station such as a mobile telephone and a satellite receiver (typically a GPS receiver). If several base stations are equipped to make their satellite data available to mobile cellular stations, the user can roam between the coverage areas of the different base stations without having to set up differential position determination equipment at different locations of known positions. Existing cellular radio system hardware may be used in particular the GPS receivers in the base station. Mobile GPS receivers and cellular stations having data transmission capabilities are already available.

The GPS unit installed at the cellular base station is preferably of a type that can provide both the timing outputs required to time-synchronise the cellular communications, and the raw measurements required for the differential positioning applications. This arrangement has significant cost benefits since the GPS receiver is required for time synchronisation of the cellular network and the ability to offer a surveying service may therefore be offered by adding features to the GPS receiver at relatively small cost. An alternative implementation is to have separate GPS timing and position determining units to produce the time synchronisation and the above-mentioned data.

Given the built-in call duration measurement and billing means found in a cellular telephone network, and the good correlation between length of availability of base station satellite data and accuracy of measurement, the presently available infrastructure is well suited to position-determination-accuracy related billing. This continuous flow of revenue is better suited to a position determination network which inevitably requires continuous maintenance rather than the historical system in which income was generated sporadically.

The invention is readily able to monitor its own performance and to calibrate new base stations as described above. Thus maintenance and expansion can be partly automated.

Due to the nature of cellular mobile transmissions, it is already necessary to have a relatively dense network of base stations in urban areas. Denser base station distribution can provide greater accuracy since the distance between the base station and position to be determined is less (therefore enhancing the effect of differential measurements) and furthermore such a dense distribution allows an increased number of adjacent base stations to be used for independent accuracy checks to be made.

A connection to a base station may be made using a conventional dial-up connection. This may be automated by the provision by the base station of the numbers of suitable adjacent base stations for additional checks on the accuracy of the data.

A mobile unit, regardless of its location within the cellular infrastructure, can be arranged to call a unique number corresponding to the type of service required (eg raw measurements or measurement corrections required) which would then automatically route its call to the nearest cellular base station satellite data source. A separate set of unique numbers may then be used automatically to route the call to the second, third or more closest cellular base stations if independent check measurements are required. The cellular infrastructure already stores information indicating which cell the mobile unit is in and can therefore be automatically arranged to locate adjacent cells.

An alternative technique is automatically to communicate data between adjacent sites and store the adjacent base station coordinates and/or raw satellite measurements locally in the adjacent cell data base so that only one base station need be accessed by the user to obtain a first measurement and one or more independent check measurements.

It will be appreciated that the IGS network is cited as one example of a highly accurate external positional reference network. Other such networks may be used to tie the base station positions into an external frame of reference, it being necessary only that the positions of the reference network nodes be known to an accuracy at least as good as that required of the position-determining apparatus. Furthermore, GPS-related terms (including measurement types) should be construed to indicate their equivalent in other satellite-based navigation systems such as the former Soviet Union's GLONASS system. Additionally, the apparatus is not limited to use with a GSM cellular radio system.

Figure 2:
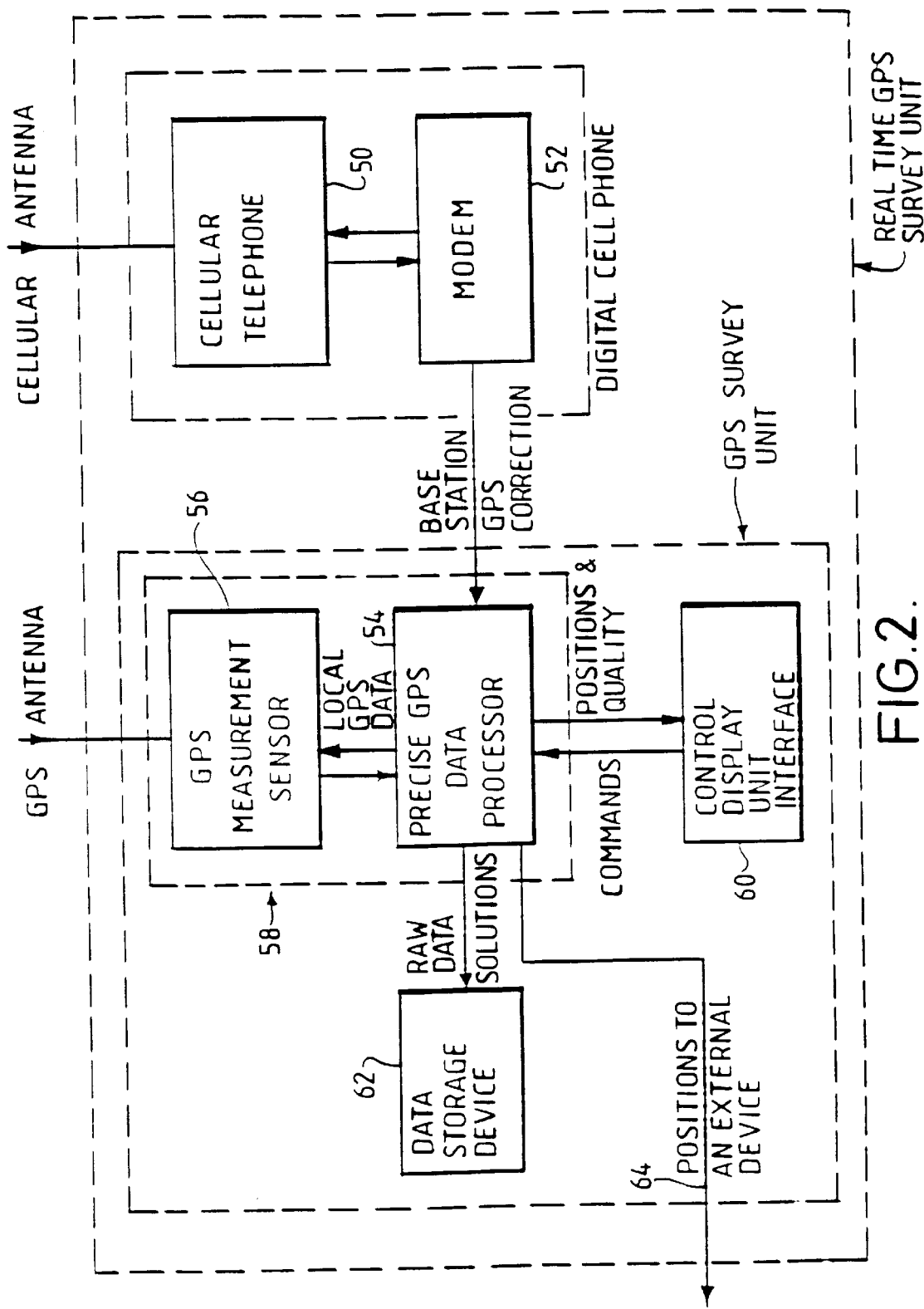
Figure 3:
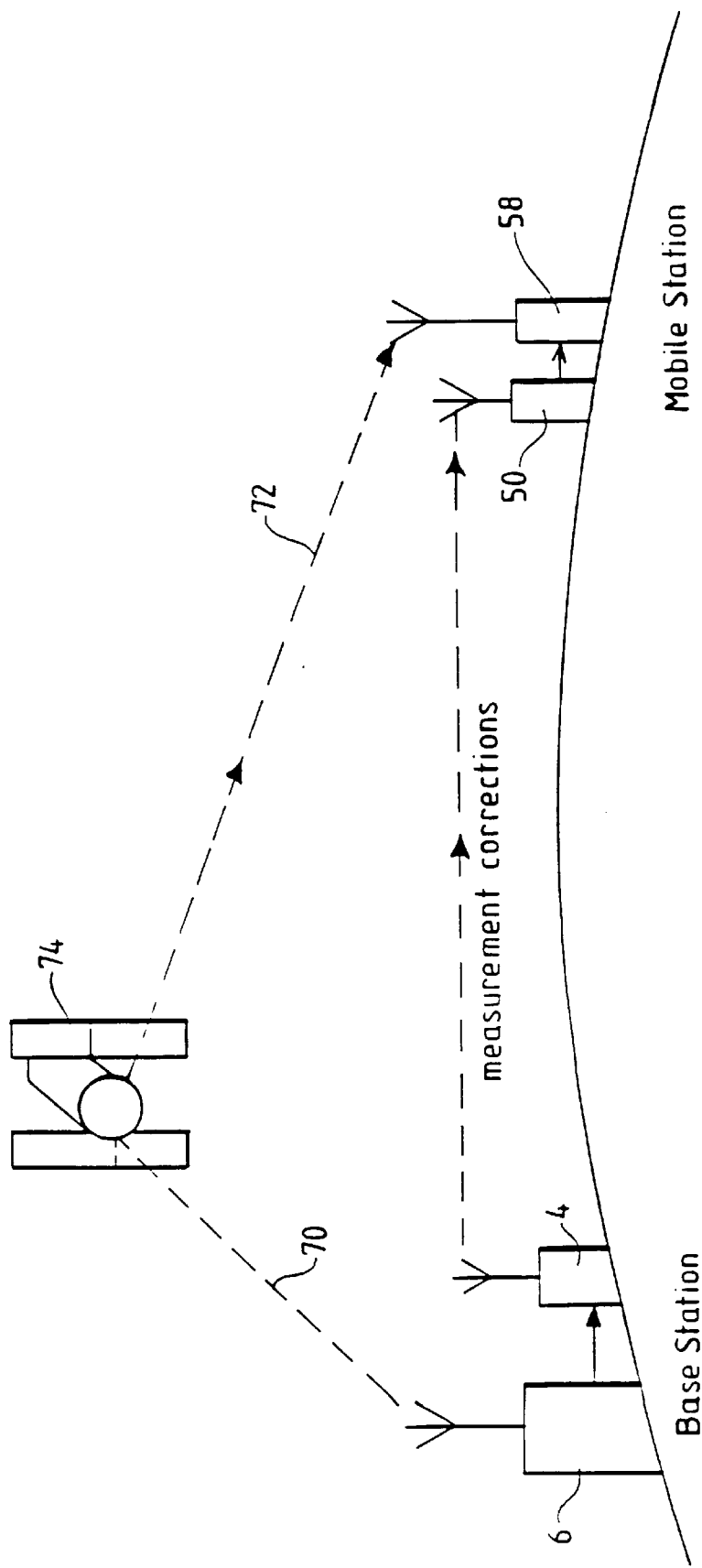

The invention will now be described by way of example with reference to the drawings in which:

FIG. 1 is a schematic block diagram of a cellular radio system in accordance with the invention; and FIG. 2 is a schematic block diagram of mobile parts a position determination means in accordance with the invention; and FIG. 3 is a schematic diagram of position determination means in accordance with the invention.

With reference to FIG. 1, which shows the fixed parts of the system in accordance with the invention, a plurality of cellular base stations 2 comprise a cellular transceiver 4 for controlling and communicating with a cellular mobile station, a GPS receiver 6, a local cell database 8 and an adjacent cell database 10.

The GPS receiver 6 is conventionally used to provide a timing and frequency reference to the cellular transceiver 4. As part of the derivation of a timing solution, the receiver 6 generates time-tagged pseudo-range and carrier phase data derived from received GPS satellite signals, given the accurate coordinates for the position of the receiver 6 sufficient information is then available to compute accurate differential GPS corrections for both carrier phase and pseudo-range measurements. The receiver 6 preferably has the capability of tracking all satellites above the horizon in order to provide high accuracy measurements. Typically the measurements are pseudoranges, allowing accuracy to within plur or minus 10 to 20 cm, and carrier phase, allowing accuracy to within plus or minus 1 mm or less.

Computed corrections for the carrier phase and pseudo-range measurements are fed into the local cell database 8. When a user wishes to make a position determination, the base station is called and its position and correction data are relayed from the local cell database 8 to the transceiver 4 for onward transmission to the user's mobile station. Alternatively, raw GPS measurements and the base station coordinates may be transmitted to the mobile station for local measurement correction calculations to be performed.

The GPS receiver 6 also operates, as a background task, to compute its position relative to an adjacent base station site, typically to an accuracy of between 1 and 3 cm. This computation is performed as a check of the correct functioning of the base station systems and therefore can be performed over several hours. The computation is performed by receiving measurement correction information from adjacent cell base stations via the adjacent cell database 10. These corrections are then used to estimate a correction for the base station's own position determination and thereby to derive a position determination relative to the adjacent base station. This relative position vector once calculated is passed via an intercell communications land line 12 to a network-wide database 14. The GPS receiver 6 may then select an alternative adjacent base station and perform an identical computation. The network-wide database 14 then holds a series of relative position vector measurements for each adjacent base station pair which may be used to calibrate the network as described below.

Having performed a position determination using satellite data (i.e. measurement corrections or raw GPS data and coordinate data) from one cellular base station 2, a user may wish to repeat the determination using an alternative base station 2 as a quality or confidence assessment. To facilitate this, the adjacent cell database 10 holds details of adjacent cell base stations such as a telephone number and any other necessary access information. This information is passed back to the user via the transceiver 4. The user may then transfer his call to another base station 2 using this information and may then perform a further position determination.

It may be desired to provide the determining means with measurement data and/or correction data from several cellular base stations simultaneously thus allowing the computation of its position relative to the same several base stations using either of the known GPS multi-baseline or GPS network computation techniques.

Information related to usage of the base station and in particular the duration of any calls made to the base station, are passed to the network-wide database 14 and then onto a customer charging system 16.

A central computing centre (CCC) 18 is connected to the network-wide database 14 (typically using an integrated services digital network (ISDN) connection). Amongst other functions, the CCC periodically reads the computed intercell relative positions computed by each base station 2, from the network-wide database 14. The CCC uses these relative positions and solution quality information to calculate new solutions for the network base station coordinates. The solutions for these coordinates are automatically positioned, orientated and scaled to fit within accurately known base station position coordinates derived directly from an accurate external reference framework such as the positions of the IGS recording stations. Periodically (typically every six or twelve months) the CCC-computed base station coordinates are published and entered into the network-wide database for use by each base station in its own GPS measurements. The coordinates are typically derived using least squares optimisation techniques.

The CCC 18 also computes position solutions for those base stations 2 which can be computed relative to an IGS tracking station. This is performed by downloading IGS tracking data, site coordinates and precise ephemerides from the IGS database 20 via an Internet connection Typically this data is available in the RINEX format (see above).

The CCC 18 may when it is reading the relative position measurements computed by the base stations monitor the performance of each base station- Since the network-wide database 14 contains many interrelated relative position measurements and in particular will usually have a relative measurement between two base stations performed by each respective base station, it is a relatively trivial task for the CCC to determine which base station is in error if unlikely relative measurement results are produced. This permits the system to continuously monitor its own performance and highlight problems automatically. Furthermore, a similar technique may be used by the CCC to calibrate a new base station site by updating the new stations adjacent cell database 10 to cause it to perform repeated relative measurements with its adjacent base stations thereby providing a set of data from which the new base station's position can be determined. Once such a position has been determined it can be published on the network-wide database 14 and the relevant adjacent cell databases 10 can be updated. It is expected that each base station may have its position determined to a confidence level of between 1 and 2 cm.

With reference to FIG. 2, a user's mobile position determination means includes a cellular telephone 50 which may be of a digital type operable directly to transmit digital data to the transceiver 4 or may be of the analogue type having a connection via a modem 52 to the base station 2.

Satellite data received from the base station transceiver 4 is communicated to a GPS data processor 54.

The data processor 54 is connected to a GPS measurement sensor 56 which passes locally measured pseudoranges and carrier phase measurements to the data processor 54. Depending on the quality of the GPS sensor 56 and the quantity of the GPS base station measurement and/or correction data received via the cellular telephone 50, a position solution for the determination means may vary in accuracy from 10 metres down to a few millimetres. The accuracy produced may be tailored to a user's particular requirements. Typically the GPS sensor 56 and data processor 54 will be in a single GPS positioning system 58.

User command inputs and outputs such as position and quality may be issued and viewed via a control display unit (CDU) interface 60.

The computed positions and/or the raw GPS data (both local and from the base station) may be logged to a data storage device 62 or fed out to an external device via a connection 64. This permits additional checks and measurements to be made at a later time, or data may be archived for QA (quality assurance) purposes.

The GPS sensor 56, the data processor 54, the CDU interface 60, the data storage device 62 and the position output connection 64 may conveniently be packaged into a single unit. This may then be connected directly by a wire link to a digital cellular telephone for communication with the base station. Alternatively, the cellular telephone may be packaged with the above-mentioned components to provide a single device capable of determining position. This may be packaged in the form of a cellular mobile telephone with an integral GPS and cellular radio antenna.

FIG. 3 shows a schematic diagram of the complete system. A satellite signal 70 is received by GPS receiver 6. Measurement corrections are passed to cellular transceiver 4 for onward transmission to cellular telephone 50. The measurement corrections are communicated to the GPS positioning system 58 which uses these corrections to determine a position relative to the base station 6 based on satellite signals 72 received locally by the mobile station from GPS satellites 74.

I claim:

1. Position-determining apparatus comprising:
    a position determination unit including a cellular mobile station coupled to a local satellite receiver,
    a cellular radio system including at least one immobile base station having a base station satellite receiver, the base station having a position determined relative to an eternal reference, the base station being arranged to transmit base station satellite data including data representing a carrier phase measurement derived from a satellite signal received by the base station satellite receiver to the mobile station via a cellular radio link and, the position determination unit being arranged to determine its position relative to the base station using local satellite data received by the local satellite receiver and to correct errors in this position determination using the base station satellite data, and
    an adjacent cell database associated with the base station for storing at least one of (a) the base station coordinate data of at least one immobile adjacent cell base station, and (b) base station satellite data generated by said at least one adjacent cell base station, the adjacent cell database being accessible to the base station to provide measurement correction data for the position of the base station itself.

2. Apparatus according to claim 1, wherein the base station satellite receiver is arranged to provide satellite-derived timing signals for synchronisation of the cellular radio system.

3. Apparatus according to claim 1 including billing means operable to measure the duration of the cellular radio link.

4. Apparatus according to claim 1, including a network-wide database for holding base station coordinate data related to the location of each base station.

5. A cellular radio system including at least one immobile base station having a base station satellite receiver, the base station having a position determined relative to an external reference, the base station being operable to transmit base station satellite data including data representative of a carrier phase measurement derived from a satellite signal received by the base station satellite receiver, for reception by a remote position determination unit comprising a mobile station coupled to a remote satellite receiver, for use in computing the position of the remote position determination unit relative to the base station based on the base station satellite data received by the remote satellite receiver, the system further including an adjacent cell database associated with said immobile base station for storing at least one of (a) the base station coordinate data of at least one immobile adjacent cell base station, and (b) base station satellite data generated by said at least one adjacent cell base station, the adjacent cell database being accessible to the base station to provide measurement correction data for the position of the base station itself.

6. A method of position determination using a cellular radio infrastructure having a plurality of immobile base stations which are of known position and include respective satellite, receivers, wherein the method comprises transmitting from at least one of the base stations having a position determined relative to an external reference, base station satellite data derived from a satellite signal received by the base station satellite receiver of the at least one base station, via a cellular radio link, wherein the base station satellite data includes data representative of a carrier phase measurement and is transmitted to a cellular mobile station coupled to a local satellite receiver, and wherein the method further comprises;
    storing in an adjacent cell database associated with said at least one immobile base station adjacent base station satellite data comprising at least one of (a) the base station co-ordinate data of at least one adjacent immobile cell base station, and (b) base station satellite data generated by said at least one adjacent cell base station; and
    determining the position of the mobile station relative to the at least one base station based on local satellite data received by the local satellite receiver, the base station satellite data received via the cellular radio link, and the adjacent base station satellite data also received via the cellular radio link.

7. A method according to claim 6, using a cellular radio infrastructure having a plurality of said base stations each of known position and each having a satellite receiver, whereby base station satellite data can be transmitted to the mobile station from any of the base stations depending on their proximity to the mobile stations.

8. A method according to claim 6, including the steps of storing in the mobile station an address code corresponding to a position determining function, which address code automatically gives the mobile station access to a database within a base station, which database contains base station satellite data, and automatically routing via the cellular radio infrastructure a call containing the said code from the mobile station to the database.

9. A method according to claim 8, including the steps of storing in the mobile station a plurality of address codes relating to a plurality of respective databases containing base station satellite data stored in a plurality of respective base stations, whereby transmission of a selected one of the said addresses codes automatically gives the mobile station access to a selected one of the databases.

10. A method according to claim 8, including storing in the mobile station an address code relating to a base station having at least one database containing satellite data from a plurality of satellite receivers located in different base stations, whereby transmission of the address code gives the mobile station access to said at least one database to permit an independent check measurement to be made.

11. A method according to claim 6, wherein the cellular mobile stations includes logging means for recording the base station satellite data and the local satellite data.

12. A method according to claim 6, wherein the positions of the base stations are calibrated by determining the position of at least one base station relative to the position of an external reference satellite position-fixing system located at a known position by passing reference satellite data derived from the external reference position fixing system to said at least one base station to permit correction of the base station position determined by the respective base station position fixing system thereby to determine an accurate position of said base station, and using the accurate position of said base station to permit said base station to replace the external reference satellite position-fixing system as a reference for the more accurate determination of the position of another of the base stations.

13. A method of operating a cellular radio infrastructure having at least one immobile base station having a position determined relative to an external reference, that at least one base station including a base station satellite receiver, wherein the method comprises transmitting at least a carrier phase measurement derived from satellite signals received by the base station satellite receiver for reception by a cellular mobile station and for computation of the position of the mobile station relative to the at least one base station, the method further comprising storing in an adjacent cell database associated with the said at least one immobile base station at least one of (a) the base station coordinate data of at least one immobile adjacent cell base station and (b) base station satellite data generated by said at least one adjacent cell base station the adjacent cell database being accessible to the base station to provide measurement correction data for the position of the base station itself.

14. A method of operating a mobile position-determining unit which includes a cellular mobile station coupled to a local satellite receiver, wherein the method comprises receiving local satellite data from the local satellite receiver, receiving from an immobile first cellular base station forming part of a cellular radio infrastructure remote satellite data which data comprising at least one of (a) base station co-ordinate data of at least one immobile adjacent cell base station of known position and forming part of said infrastructure and (b) base station satellite data generated by said at least one adjacent cell base station, and computing the position of the mobile unit relative to said infrastructure based on the local satellite data and on the adjacent base station satellite data.

15. A method of determining the position of a plurality of cellular and immobile base stations forming part of a cellular radio system, each base station having a base station satellite position fixing system, wherein the method comprises:

determining the position of at least one of the base stations relative to the position of an external reference satellite position fixing system which is located at a known position;

passing reference satellite data derived from the external reference position fixing system to said at least one base station;

correcting the base station position determined by the respective base station position fixing system using said reference satellite data thereby to determine an accurate position of said base station; and using the accurate position of said base station to permit said base station to replace the reference satellite position fixing system as a reference for the more accurate determination of the position of another of the base stations.

16. A method of determining the position of a plurality of cellular base stations forming part of a cellular radio system, each base station having a base station satellite position fixing system, wherein the method comprises determining the position of at least one of the base stations relative to the position of an external reference satellite position fixing system located at a known position by passing reference satellite data derived from the external reference position fixing system to said at least one base station to permit correction of the base station position determined by the respective base station position fixing system thereby to determine an accurate position of said base station, and using the accurate position of said base station to permit said base station to replace the reference satellite position fixing system as a reference for the more accurate determination of the position of another of the base stations; and monitoring the performance of a first base station by comparing relative position measurements of the same position performed using different combinations of base stations including the first base station and determining which base station is in error if relative measurement results falling outside expected parameters are produced.

* * * * *